United States Patent [19]

Byers et al.

[11] Patent Number: 5,549,968
[45] Date of Patent: Aug. 27, 1996

[54] COMPRESSIBLE FABRIC SUBSTRATE

[75] Inventors: Joseph L. Byers, Inman; W. Toriran Flint, Spartanburg, both of S.C.; Richard C. Kerr, Rutherfordton, N.C.

[73] Assignee: Reeves Brothers, Inc., Spartanburg, S.C.

[21] Appl. No.: 208,163

[22] Filed: Mar. 8, 1994

Related U.S. Application Data

[60] Division of Ser. No. 116,819, Sep. 3, 1993, Pat. No. 5,334,418, which is a continuation-in-part of Ser. No. 794,261, Nov. 15, 1991, abandoned.

[51] Int. Cl.$^6$ .............. B32B 5/24; B32B 5/28; B32B 33/00; B41N 10/04
[52] U.S. Cl. .............. 428/241; 74/18; 101/376; 101/379; 277/88; 277/DIG. 9; 285/335; 285/423; 428/245; 428/246; 428/306.6; 428/308.4; 428/313.5; 428/313.7; 428/313.9; 428/315.5; 428/315.9; 428/317.9; 428/909; 428/340
[58] Field of Search .............. 428/909, 241, 428/246, 245, 306.6, 308.4, 313.5, 313.7, 313.9, 315.5, 315.9, 317.9, 340

[56] References Cited

U.S. PATENT DOCUMENTS

| | | | |
|---|---|---|---|
| 2,099,024 | 11/1937 | Lewis . | |
| 2,797,201 | 6/1957 | Veatch et al. . | |
| 2,885,303 | 5/1959 | Kaplan . | |
| 3,147,698 | 9/1964 | Ross | 101/149.2 |
| 3,219,600 | 11/1965 | Rucker . | |
| 3,479,811 | 11/1969 | Walters | 57/153 |
| 3,615,972 | 10/1971 | Morehouse, Jr. et al. | 156/79 |
| 3,700,541 | 10/1972 | Shrimpton et al. | 161/160 |
| 3,795,568 | 3/1974 | Rhodarmer et al. | 428/909 |
| 3,983,287 | 9/1976 | Goossen et al. | 428/241 |
| 4,042,743 | 8/1977 | Larson | 428/306 |
| 4,044,176 | 8/1977 | Wolinski | 428/373 |
| 4,081,318 | 3/1978 | Wietsma | 427/373 |
| 4,770,928 | 9/1988 | Gaworowski et al. | 428/284 |
| 5,334,418 | 8/1994 | Byers | 428/373 |

FOREIGN PATENT DOCUMENTS

| | | | |
|---|---|---|---|
| 2163041 | 7/1973 | France . | |
| 1165046 | 3/1964 | Germany . | |
| 1400932 | 7/1975 | United Kingdom . | |
| 2033395 | 5/1980 | United Kingdom | 427/373 |

OTHER PUBLICATIONS

Ross, The Use of Compressible Materials in Printing, Share Your Knowledge Review, No. 2 (Nov. 1964), pp. 7–9.
Ross, Easing the Distortion Dilemma, pp. 189–192.
Kirk Othmer Encyclopedia of Chemical Technology, 3rd ed., vol. 16, pp. 725–741 (1980).

*Primary Examiner*—James C. Cannon
*Attorney, Agent, or Firm*—Pennie & Edmonds

[57] ABSTRACT

A composite fabric structure comprising a plurality of warp and fill fibers or yarns forming a fabric substrate which is impregnated with a matrix material which contains a plurality of cells which impart compressibility to the fabric substrate. This fabric may be used, for example, in a composite structure for use with one or more additional layers or coatings. Articles which may be formed from the composite structure include gaskets, packing materials, flexible diaphragms or printing blankets. In the printing blankets, one or more of a vulcanized rubber layer, a fabric layer and a compressible layer may be included.

22 Claims, 1 Drawing Sheet

COMPRESSIBLE FABRIC SUBSTRATE

CROSS-REFERENCE TO RELATED APPLICATIONS

This application is a division of application Ser. No. 08/116,819, filed Sep. 3, 1993 and issued Aug. 2, 1994 as U.S. Pat. No. 5,334,418, which application is a continuation-in-part of application Ser. No. 07/794,261 filed Nov. 15, 1991, now abandoned.

BACKGROUND OF THE INVENTION

1. Technical Field

This invention relates to compressible fabric substrates, in particular those containing a plurality of closed cells therein, for use in composite structures such as printing blankets, gaskets, packing materials, flexible diaphragms and the like.

2. Description of Related Art

Although not limited to use in printing blankets, the development of the present invention is particularly adaptable to printing blankets, and thus the history of improvements made to such printing blankets to increase their compressibility is applicable to the present invention.

Early printing blankets used in connection with rotary printing operations consisted of a fabric substrate backing layer bonded to a rubber printing face (see, e.g., U.S. Pat. No. 2,099,024 to Lewis). Problems with these early blankets stemmed from the fact that rubber is non-compressible when confined. Thus, when pressure was applied to the non-compressible rubber surface, the rubber would distort and cause uneven rolling waves at the nip, i.e., the point between the printing blanket and the impression cylinder. Such distortions would cause ink smearing and compression of the textile backing. Further, repeated compression of rubber blankets during the printing operation tended to cause permanent impressions in the blanket and irreparable damage to the textile backing.

In an attempt to solve many of the aforementioned problems, compressible printing blankets were developed. Compressible blankets today generally consist of a multi-ply fabric substrate base with a compressible cellular layer or layers and a vulcanized elastomeric face. One such compressible blanket is described in U.S. Pat. No. 3,147,698 to Ross. In that patent, the compressible layer is formed by impregnating a highly porous felted fibrous web with an elastomeric material in a solution or water dispersion, such as a natural rubber latex, followed by curing the web under such conditions that it retains a high degree of porosity. Thus, a large volume of minute voids or air spaces were obtained in the finished sheet to constitute the compressible layer which is responsible for the compressibility property of the web.

Subsequent improvements in offset printing blankets to date have been directed toward achieving the desired properties of volume compressibility, resistance to lateral distortion and sufficient firmness, i.e., the resiliency to "spring back" after use. A blanket having all these properties may be formed by gluing together several layers of material with an adhesive, with each layer possessing one or more of the desired properties. Typically, a layer of firm, non-extensible woven material is used to provide resistance to circumferential and lateral distortion of the blanket. Compressibility and resiliency have been achieved by selecting layers having such characteristics in the construction of the blanket.

One such development is disclosed in U.S. Pat. No. 4,042,743 to Larson. In that patent, the compressible layer is sandwiched between one or more layers of fabric. The compressible layer is made by incorporating resin microballoons in suitable proportions in an elastomer. Incorporation of such balloons in the compressible elastomeric layer imparts a fine-celled structure of closed cells.

Another method of producing such a closed cell or partially closed cell rubber containing microballoons is described in U.S. Pat. No. 3,219,600 to Rucker.

Similar uses of microballoons or hollow microspheres in the compressible layers of printing blankets are disclosed in U.S. Pat. Nos. 3,700,541 to Shrimpton et al, 3,983,287 to Goossen et al, and 4,770,928 to Gaworowski et al. In these patents, hollow microballoons are impregnated in a resilient polymer or the like to form a compressible elastomeric sheet for use as an intermediate layer in a printing blanket.

It is also known by U.S. Pat. No. 2,885,303 to Kaplan that microballoons can be adhered to the yarns or threads of a fabric, but not to the spaces therebetween, by use of a binder or lacquer containing same to form a breathable fabric.

SUMMARY OF THE INVENTION

The present invention provides an improved printing blanket that incorporates a new fabric which imparts improved resistance to lateral distortion, wicking due to transport of solvent or gas, and caliper loss, while also improving compression set, resilience, reboundability, smash resistance and compressibility properties. With the use of the fabric of the invention, the need for compressible layers to achieve the aforementioned desired properties is obviated.

A first embodiment of the invention relates to a fabric comprising a plurality of warp and fill fibers forming a fabric substrate and a matrix material on at least one side of the fabric substrate in an amount sufficient to at least partially impregnate substantially all of the fibers, yarns and interstices of the fabric substrate. The matrix material contains a plurality of cells therein in an amount sufficient to impart increased compressibility to the fabric. If desired, the matrix material may be present on both sides of the fabric substrate to substantially encapsulate and surround all fibers or yarns.

In one arrangement, the cells may be closed cells formed by microspheres. Generally, the microspheres are made of thermoplastic resins, thermosetting resins, ceramics, glass and sintered metals. A preferred thermosetting resin for the microspheres of the invention is a phenolic resin having a density of between about 0.01 and 0.05 grams per cubic centimeter. The microspheres range in diameter between about 1–200 and preferably 50–130 microns, and are dispersed relatively uniformly throughout the matrix material. Also, the microspheres are present in the matrix material at loadings of about 4 to 90% by weight and preferably about 10 to 70%. If desired, the microspheres may include a coating thereon to enhance bonding with the matrix material.

In another arrangement, the cells may be formed from gas bubbles which are trapped in the matrix material during curing or setting. This can be achieved by substantially uniformly distributing a decomposable blowing agent into the matrix material and decomposing the blowing agent as the matrix material cures or sets. Also, a gas such as air can be mechanically induced into the matrix material before the setting or curing of same.

In this fabric, any natural or synthetic fibers, filaments, or yarns can be used, but it is preferred for the warp and fill fibers or yarns which each have a tensile strength of at least about 30 psi. The preferred fabric weight is between about 4 and 8 oz. per sq. yd.

A preferred matrix material is a thermoplastic or thermosetting resin, a polyurethane or a natural or synthetic elastomer. The nitrile, neoprene or acrylic elastomers are preferred.

Another embodiment of the invention relates to a composite article which utilizes the compressible fabric described above in combination with at least one additional coating or layer to impart a desired property to the article. In one aspect of this embodiment, the additional layer or coating may be a thermoplastic or thermosetting resin, a polyurethane or a natural or synthetic elastomer so that the article may be used as a gasket, packing member or a flexible diaphragm. The additional layer or coating can be selected to impart anti-wicking properties to the article. The design, shape, dimensions and configuration of the article is not critical to the invention provided that the novel fabric is included therein to improve its resiliency and compressibility.

Another application for the new fabric is in a composite structure which is utilized for printing blankets, impression blankets, and plate cushions which can be used in all types of printing presses (offset, flexographic, letter press, etc.) Moreover, the printing blanket of the invention may be manufactured under conventional conditions with the exception that one or more of the compressible fabrics discussed above may be incorporated into the blanket. The impregnation of such a cellular, compressible material into a fabric yields the desired properties of volume compressibility, resistance to lateral distortion and improved resilience.

An additional embodiment of this invention relates to a method for making the compressible fabric described above. The method involves the steps of forming a matrix material having a plurality of cells therein, and applying the matrix material to at least one side of a fabric substrate comprising a plurality of warp and fill fibers or yarns to at least partially surround and impregnate substantially all of the fibers, yarns and interstices of the fabric substrate and impart increased compressibility properties to the fabric, followed by curing the matrix material to obtain the fabric.

The matrix may be applied to both sides of the fabric substrate by dipping the fabric substrate into a solution of the matrix material and then removing excess solution. Alternatively, the matrix material can be calendared or spread coated in one or a plurality of layers onto one side or both sides of the fabric structure by conventional methods. In carrying out these application methods, the matrix material may be cured by heating. The heating step is preferably carried out for a sufficient time and at a sufficient temperature to set the matrix material in its desired final hardness.

The amount of matrix material added to the fabric substrate can be varied according to the final use application of the compressible fabric substrate. The matrix material can be applied such that the thickness of the impregnated fabric substrate is substantially the same as the unimpregnated matrix material by, for instance, scraping with a doctor blade, to avoid increasing the thickness of the impregnated fabric substrate beyond that of the unimpregnated fabric structure.

The cells may be formed in the matrix by substantially uniformly distributing a plurality of microspheres into the matrix material. Alternatively, a decomposable blowing agent can be distributed throughout a matrix forming material to form the cells by decomposition of the blowing agent as the matrix material is formed, e.g., by curing the matrix forming material. In addition, the cells may be formed by mechanically inducing gas bubbles into the matrix forming material prior to forming the matrix material.

The method described above may further include incorporating one or more of these compressible fabrics into a composite material having a plurality of layers. This composite material may be used to form articles such as printing blankets or gaskets, packaging materials or flexible diaphragms having the improved properties described above.

DESCRIPTION OF THE PREFERRED EMBODIMENTS

Figure 1:
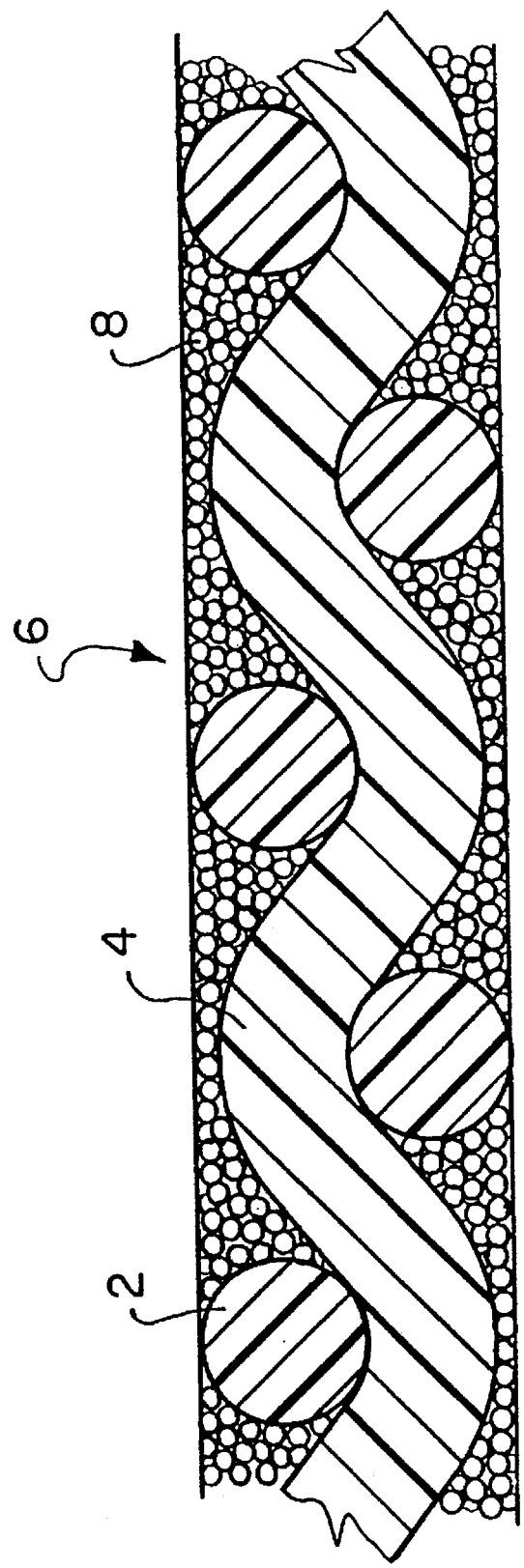
FIG. 1 is an enlarged, cross-sectional view of the fabric of the invention.

According to the present invention, the foregoing as well as other advantages are achieved by the incorporation of the compressible fabric in a composite article, such as a printing, impression or flexographic blanket.

FIG. 1 is a cross-sectional view of one embodiment of a compressible fabric according to the present invention. Warp fibers 2 and fill fibers 4 comprise the fabric substrate and are formed of natural or synthetic fibers, which may be woven or non-woven and spun or filament yarn of the desired length. Cotton, polyester, nylon and rayon are typical materials which may be used as fibers or yarns in this invention.

Preferably, the warp fibers are formed from natural material such as cotton whereas the fill fibers are comprised of a synthetic textile such as, e.g., rayon. Both the warp and fill fibers or yarns should have a tensile strength of at least 30 psi. In the most preferred embodiment, the warp fibers are comprised of 20/2 ply long staple cotton while the fill fibers are formed of 20/1 ply high wet modulus rayon. The substrate preferably has a yarn count per inch ranging between about 55–61 (warp) and 57–63 (fill). This fabric substrate ranges between about 5.8 to 6.2 ounces/sq. yd. in weight and from 0.014 to 0.016 inches in thickness. The warp direction has a tensile strength of at least about 150 pounds/in. whereas that of the fill direction is at least about 60 pounds/inch. Moreover, in the preferred embodiment, the fabric substrate should be capable of no more than about 1.9% residual stretch.

Additional fabrics suitable for use in the present invention include but are not limited to those disclosed in U.S. Pat. No. 4,042,743 to Larson et al., the disclosure of which is expressly incorporated herein by reference thereto.

The fabric substrate is spread coated, calendared, dipped or otherwise contacted with a matrix material. Suitable matrix materials include thermoplastic resins, thermosetting resins, polyurethanes, or natural or synthetic elastomers. PVC and other polyolefins are suitable thermoplastic resins, while preferred polyurethanes are disclosed in U.S. Pat. Nos. 5,001,208 and 5,013,811, which are each expressly incorporated herein by reference thereto. One skilled in the art is aware of a number of techniques for applying these matrix materials in liquid form (i.e., by a solvent solution or a latex dispersion) to a fabric substrate.

The preferred matrix material is an elastomeric compound 6. To form the cells, any of a wide variety of microspheres 8 can be added to a solution or dispersion of the elastomer.

If solvent solutions are utilized, the selected microspheres must be resistant to chemical attack from the solvents.

Several acceptable types of thermoplastic microspheres for use with the present invention are marketed, for example, by Expancel and Pierce & Stevens. Microspheres of a thermoset resin are preferred for this embodiment. Most preferred are those formed of a phenolic resin having a density of between about 0.02 and 0.03 gms/cc and most preferably about 0.023 gms/cc.

Pierce & Stevens also markets microspheres under the trade name DUALITE, which includes a variety of coatings upon the microballoons. Proper selection of the sphere/coating composite further enhances the bonding between the fabric and the elastomer matrix. U.S. Pat. No. 3,615,972 to Morehouse, the disclosure of which is incorporated herein by reference, discloses a number of techniques used in manufacturing microspheres of the type suitable for use in the present invention.

The preferable diameter range for microspheres is typically between about $50\mu$ and $130\mu$ with an average size of about $90\mu$ being preferred. Generally, the microspheres are uniformly distributed throughout the elastomer in such a way as to avoid any appreciable crushing of the microspheres. Additionally, the microspheres are incorporated in the elastomeric material at a loading of about 4–90% and preferably 10–70% of the solid contents. This percentage will vary based on such factors as microballoon dimension and wall thickness and bulk density.

The elastomers best suited for use in this invention are of the acrylonitrile, neoprene, and acrylic families. Polysulfides, alone or in combination with acrylonitrile or neoprene, can also be used. Any natural or synthetic elastomer can be used, if desired.

As noted above, the elastomer may be applied to the fabric as a latex dispersion or by a solvent carrier. Latex cements of these elastomers are preferred. The elastomer most preferred for forming the matrix is a self-curing nitrile latex elastomer having a total solid content of between about 30–60%, preferably between about 45–50% and most preferably about 47%. The pH of this material should be slightly acidic, i.e., preferably in the range of about pH 6–7. The preferred viscosity for the matrix material ranges between about 80–90 cps and is most preferably about 85 cps.

In an uncoated fabric substrate, spaces or interstices, appearing on the surface of, or between the, fibers making up the fabric substrate allow movement of the fibers upon the application of pressure to the fabric. Such movement can lead to the displacement of the fibers from their original position, causing lateral distortion, loss of compressibility and resilience, and the eventual loss of gauge (i.e., thickness) of the fabric.

Impregnating the spaces or interstices of a fabric substrate with compressible matrix material decreases the ability of the fibers to move, or if movement occurs, provides a counter force to move the fiber back to, or close to, its original position. Accordingly, impregnation of a fabric substrate improves the compression set, resilience, reboundability, smash resistance and compressibility of the fabric. Moreover, the impregnation step is conducted in a manner to avoid forming any appreciable layer of matrix material upon the fabric substrate so that the thickness of the impregnated fabric substrate is substantially the same as the unimpregnated fabric.

Although under certain application techniques a thin coating of matrix material may be present on portions of the surface of the fabric substrate, it is preferred that the thickness of the impregnated fabric substrate to be no greater than the thickness of the unimpregnated fabric structure. This feature is important when the compressible fabric is used in the construction of a printing blanket, where space is at a premium, because the properties of the blanket are improved without increasing its thickness or without using additional compressible layers.

When applied, the microsphere loaded material described hereinabove will substantially impregnate and encapsulate the fibers, yarns and interstices of the fabric substrate on one side. When both sides of the fabric are to be coated, the preferred method of application of the microsphere loaded matrix material is by use of a dip tank and squeeze rolls. The fabric substrate is fed through the dip tank containing the elastomeric/microsphere mixture and subsequently through squeeze rollers to force the liquid into the fabric. Alternatively, the matrix material can be applied onto one side of the fabric by a spread coating operation using a knife-over-roll device. The knife or blade is set to be even with or slightly below the surface of the fabric to assure that the matrix does not protrude above the surface so that the thickness of the fabric substrate is not increased. The elastomer/microsphere fabric is then dried and/or vulcanized according to conventional methods to form a compressible fabric.

In order to prevent migration of the matrix material out of the impregnated fabric the binder material is chosen for its ability to rapidly saturate the yarns and fill the interstices of the fabric. The degree of impregnation is controlled through a combination of the binder material's flow properties, the blade height and the blade angle such that the binder material just reaches the opposite side of the fabric substrate, without going beyond that side. The binder material is pushed completely within the fabric substrate, leaving none of the binder material above the outer surfaces of the fabric substrate. In such a way, the fabric substrate is completely saturated without increasing the gauge.

In addition, the matrix material is placed within the fabric such that after expansion of the microspheres, the thickness of the impregnated fabric substrate remains substantially the same as the unimpregnated original fabric substrate. Generally, one side of a fabric substrate is to be impregnated, only about 33–45 g/yd$^2$ of matrix material is applied. This amount is increased to about 45–60 g/yd$^2$ when both sides of the fabric substrate are impregnated. This relatively small amount is retained within the original thickness dimension of the fabric, both before and after the microspheres are expanded. Thus, no layer of matrix material is formed upon or on the outer surfaces of the fabric substrate.

Cells may also be formed in the matrix material by mechanically inducing air into a matrix forming material before it is applied to the fabric, such as by aerating or stirring. Another means of creating cells is to use chemical blowing agents (the term foaming agents also is used) that are decomposable into gases as they are cured in a compound. One such class of blowing agents are the Cellogens™ which are manufactured by Uniroyal (Cellogen is a registered trademark of Uniroyal). Cellogens are decomposable in the presence of heat, which may be applied during curing. Many other types of blowing agents are commercially available with a wide range of decomposition characteristics.

The new fabric can be included in a variety of applications where a resilient or compressible material is needed. Usually, the fabric is included in a composite structure with other layers of components or materials. These composite structures can be used as packing materials, gaskets or flexible diaphragms which can be used to make a complement of devices generally known as seals. A static seal can be formed by the placement of the gasket or packing material between two joint faces with the application of greater pressure to the seal than that is exerted by the contained liquid or gas from within the joint. A wide variety of flange, metal to metal, self tightening, threaded, concentric, and special cavity joint designs can be used to retain the seal therein.

Depending on the type of design and the shape of the gasket, the compressibility and resiliency of the gasket material becomes an important consideration. Generally, the preferred gaskets are those which are of a resilient, predictably compressible composition of one or several materials which can conform easily to joint face surface irregularities and can compensate for joint face distortion during operation and thermal fluctuations.

This fabric can be used to make resilient, compressible, composite structures which are useful as gasketing, packing materials and flexible diaphragms. A flexible diaphragm is defined as a sealing device that not only prevents gas or liquid seepage between two flanges, but also is flexible within any given orifice for the purpose of pressure regulation. The use of compressible fabrics in such an article changes the surface tension of the film applied, thus increasing flexibility. This enhances pressure regulation at very low pressures.

Gasket sealing effectiveness generally improves with softer materials while higher sealing pressure capability is obtained with harder materials. Properties such as temperature resistance, impermeability, chemical resistance, and dimensional stability must be maximized for a successful gasket design to be achieved. In these applications, the loading force on the gasket must be sufficient to resist hydrostatic forces from the material to be contained while also retaining a sufficient compression load on the gasket to maintain a leak-free joint. When the joint is to be accessed frequently, compressibility becomes a significant concern for successful operation of the gasket.

Rubber properties, as well as those of other elastomers, make those materials very desirable as gasketing, packing materials or flexible diaphragms. The elastomer selected for specific gasket application must be tailored to the operating parameters. Various materials, such as perfluoroelastomer rubber, nitrile rubber, silicone rubber, neoprene, natural rubber and others, are typically used. In order to impart compressibility to the elastomeric gasket, the compressible fabric of the invention can be included. Depending upon the specific properties desired, the gasket can be made of a plurality of layers of the same or different materials. Also, various gasket designs are known to optimize the performance of the material in the intended service. This compressible fabric may be incorporated with one or more additional elastomeric layers to form an improved gasket, packing material or flexible diaphragm. The microspheres impart compressibility to the fabric which often is an important consideration in such sealing operations. In addition, the elastomeric material encapsulating the fabric structure substantially reduces wicking through the fabric of fluids or gases which must be contained within a vessel or other container by the seal.

A particular use of such gaskets is as a seal in pressure gauges for compressed gas tanks. These gauges are turned off and on a number of times by the operator who is attempting to access the gas in the tank, so that the gasket must have sufficient compressibility properties to withstand the numerous openings and closings thereof. When the fabric of the invention is used in combination with an acrylonitrile or nitrile rubber layer to form a gasket or flexible diaphragm for this application, improved anti-wicking properties are obtained. In addition, the improved compressibility properties allow the article to provide a much longer service life compared to one which does not include a compressible fabric.

It is also possible to increase the compressibility properties of the fabric by using spun yarn rather than filaments. The filament materials are relatively incompressible, whereas spun yarns have a predetermined level of compressibility. Thus, it is possible to achieve a compressible fabric for use in a gasket, packing or flexible diaphragm material wherein the fabric structure is comprised of filaments rather than spun yarn, by using the compressible fabric of the invention. In addition, the combination of spun yarn fabric with the compressible fabric of the invention would provide better compressibility and more compensation and forgiveness compared to conventional gaskets. This is an advantage in applications where the gasket, packing material or flexible diaphragm is over torqued or otherwise subjected to high compressive loading.

The fabric may also be incorporated as one or more of the fabrics which are used in a printing blanket. The composite formed is superior to the printing blankets of the prior art. In a printing blanket, space is at a premium, and designers have found that the physical dimensions required of printing blankets severely limit the structural options. This invention will lessen such dimensional constraints by allowing the designer to transfer a portion or all of the compressibility and all of the resistance to lateral distortion of the blanket to the fabric as opposed to using single or multiple elastomeric compressible layers in addition to single or multiple layers of fabric substrate.

Even if such dimensional constraints are not a problem, the present invention is advantageous over the prior art in that it can be used strictly to enhance the performance characteristics of the printing blanket. Aside from resistance to lateral distortion, blanket fabric substrates do not generally confer a positive influence on performance characteristics. Thus, the present invention should significantly improve the properties of a printing blanket which utilizes such a fabric. By utilizing a compressible fabric according to the invention, a reduced compression set of the fabric is achieved along with improved resilience or reboundability of the fabric, improved smash resistance of the fabric, compressibility, improved fabric resistance to wicking due to liquid or gas transport therethrough, and improved caliper loss resistance.

EXAMPLES

The scope of the invention is further described in connection with the following examples which are set forth for purposes of illustration only and which are not to be construed as limiting the scope of the invention in any manner.

One example of a preferred fabric and a process for forming the same, is as follows:

Example 1

Fabric:

Yarn Composition:

Warp: 20/2 ply Long Staple Cotton
Fill: 20/1 ply H.W.M. Rayon
Yarn Count:

Warp: 58 ± 3
Fill: 60 ± 3
Weight:

6 ± 0.2 oz./yd.²
Thickness:

0.015" ± .001"
Tensile Strength:

Warp: 150 lbs. (min.)
Fill: 60 lbs. (min.)
% Residual Stretch:

1.9% (max.)
Microballoon:

Union Carbide UCAR BJO-093 phenolic resin (thermoset)
Avg. Particle Size: 90 (μ)
Density: 0.023 gms/cc
Elastomeric Matrix:

Hycar 1572 × 64 (self curing nitrile latex elastomer)
Total Solids          47.3
pH                    6.5
Viscosity (cps)       85
Surface tension (dynes/cm)  43

The process used to produce the fabric, comprising three steps, is described as follows:

i) The microspheres are added to the nitrile latex and the mixture is stirred until the microballoons are completely dispersed.

ii) The microsphere/latex mixture is then applied to the fabric via a dip tank with squeeze rollers and doctor blades. The dipping and squeeze rollers are used to insure maximum fabric penetration, and the doctor blades are used to scrape off excess surface material.

iii) The composite web is then passed through a conventional coating oven or passed over drying cans to facilitate vulcanization. The vulcanization time is typically 3–5 minutes at 250°–300° F.

Example 2

Two samples of fabric having the following properties were used in this example.

Yarn Composition:

Warp: 20/2 ply long staple cotton
Fill: 20/1 ply H.M.W. Rayon
Yarn Count:

Warp: 58 ± 3
Fill: 56 ± 3
Weight:

6 ± 0.2 oz/yd²
Thickness:

0.015" ± .001
Tensile Strength:

Warp: 150 lbs. (min.)
Fill: 60 lbs. (min.)
% Residual Strength:

1.9% (max.)

One sample of the fabric was subjected to repetitive compression using an Instron 8511 high speed cyclic compression tester to simulate the recurrent compression that a printing blanket would undergo. The results of this test are shown in Table 1.

TABLE 1

| Run Number | Load at 0.1 mm (kg) | Stress at 0.1 mm (kg/cm²) | Cycle Number |
| --- | --- | --- | --- |
| 1 | 419.4 | 26.38 | 6 |
| 2 | 708.6 | 44.56 | 2006 |

As can be observed from table 1, unimpregnated fabric suffered a loss of compressibility and resilience as indicated by the increases in the stress and load at 0.1 mm.

The second sample of fabric, having the same properties as the sample above, was impregnated with Expancel 091-DE microspheres having an average particle size of 8–11 cubic micrometers (unexpanded) and a density of less than 17 kilograms/meter as follows:

(1) The Expancel microspheres were added to a low viscosity, highly flowable, neoprene latex in an amount equal to about 3% of the dry weight of the latex. The mixture was stirred until the microspheres were completely dispersed.

(2) The microsphere/latex mixture was then applied to the fabric using a knife over roll spreader. The blade height and blade angle were adjusted such that the binder material just reaches the opposite side of the fabric substrate, without going beyond that side. The binder material is pushed completely within the fabric substrate, leaving none of the binder material beyond the outer surfaces of the fabric substrate.

(3) The impregnated fabric was then passed through a conventional coating oven to expand the microspheres, dry the latex, and initiate curing of the latex.

The sample so impregnated was then subjected to the same repetitive compression as the first sample using a Instron 8511 high speed cyclic compression tester. The results are as follows:

TABLE 2

| Run Number | Load at 0.1 mm (kg) | Stress at 0.1 mm (kg/cm²) | Cycle Number |
| --- | --- | --- | --- |
| 3 | 449.8 | 28.29 | 6 |
| 4 | 424.0 | 26.66 | 2006 |

As Table 2 indicates, the impregnated fabric sample illustrative of the present invention has a load and stress at 0.1 mm that remains substantially unchanged after 2006 cycles. In contrast, the load and stress at 0.1 mm for the unimpregnated fabric became much higher after 2006 cycles. These test results indicate that the impregnated fabric has retained substantially all compressibility and resilience while the unimpregnated fabric has not.

As is apparent from the foregoing, the present invention is susceptible of being embodied with various alterations and modifications which may differ particularly from those that have been described in the proceeding specification and description. For this reason, it is to be fully understood that all of the foregoing is intended to be merely illustrative and is not to be construed or interpreted as being restrictive or otherwise limiting of the present invention, except as set forth in the following claims.

What is claimed is:

1. A compressible fabric comprising a plurality of warp and fill fibers or yarns forming a fabric substrate and a matrix material on at least one side of the fabric substrate in an amount sufficient to at least partially impregnate substantially all of the fibers, yarns, and interstices of the fabric substrate, the matrix material containing a plurality of cells therein in an amount sufficient to impart increased compressibility properties to the fabric, wherein the thickness of the partially impregnated fabric substrate is substantially the same as the unimpregnated fabric substrate.

2. A compressible fabric comprising a plurality of warp and fill fibers or yarns forming a fabric substrate and a matrix material on at least one side of the fabric substrate in an amount sufficient to at least partially impregnate substantially all of the fibers, yarns and interstices of the fabric substrate, the matrix material containing a plurality of cells therein in an amount sufficient to impart increased compressibility properties to the fabric, wherein the thickness of the partially impregnated substrate is substantially the same as that of the unimpregnated substrate.

3. The fabric of claim 2 wherein the fibers or yarns have a tensile strength of at least about 30 psi and the matrix material is present on both sides of the fabric substrate to substantially encapsulate and surround all fibers or yarns.

4. The fabric of claim 2 wherein the cells are formed from microspheres having a diameter of between about 1 and 200 microns which are dispersed relatively uniformly throughout the matrix material.

5. The fabric of claim 4 wherein the microspheres are made of a thermoplastic resin, thermosetting resin, ceramic, glass or sintered metal.

6. The fabric of claim 5 wherein the microspheres are made of a phenolic resin and have a diameter of between 50 and 130 microns.

7. The fabric of claim 4 wherein the microspheres include a coating to enhance bonding with the matrix material.

8. The fabric of claim 4 wherein the microspheres are present in the matrix material at a loading of about 4 to 90% by weight.

9. The fabric of claim 2 wherein the cells are formed from gas bubbles which are trapped within the matrix.

10. The fabric of claim 2 wherein the warp fibers or yarns have a tensile strength of at least about 100 psi, the fill fibers or yarns have a tensile strength of at least about 50 psi, and the fabric substrate has a weight of between about 4 and 8 ounces per square yard.

11. The fabric of claim 2 wherein the matrix material is a thermoplastic resin, thermosetting resin, polyurethane, or natural or synthetic elastomer.

12. The fabric of claim 11 wherein the elastomer is nitrite, neoprene or an acrylic elastomer.

13. A compressible fabric comprising a plurality of warp and fill fibers or yarns of natural or synthetic materials forming a fabric substrate having a weight of between about 4 and 8 ounces per square yard, the warp fibers or yarns having a tensile strength of at least about 150 pounds/inch and the fill fibers or yarns have a tensile strength of at least about 60 pounds/inch; a natural or synthetic elastomeric material which surrounds substantially all of the fibers or yarns, thus at least partially impregnating said fabric with said elastomeric material; and a plurality of microspheres having a diameter of between about 50 and 130 microns at a loading of about 10 to 70% by weight of the elastomeric material and dispersed substantially uniformly therein and throughout to impart compressibility properties to the fabric, wherein the thickness of the at least partially impregnated fabric is substantially the same as that of the unimpregnated fabric.

14. A composite article comprising the compressible fabric of claim 2 and at least one additional layer or coating which imparts a desired property to the article.

15. The article of claim 14 wherein the additional layer imparts environmental, chemical or anti-wicking resistant properties to the article.

16. The article of claim 14 wherein the matrix material is a thermoplastic resin, thermosetting resin, polyurethane, or natural or synthetic elastomer.

17. A composite article comprising the compressible fabric of claim 13 and at least one additional layer or coating which imparts a desired property to the article.

18. The article of claim 17 wherein the additional layer includes an elastomeric material which is compatible with the elastomeric material of the fabric.

19. The article of claim 18 wherein the elastomeric material of the additional layer is acrylonitrile, neoprene or a perfluoroelastomer and the article is used as a gasket, packing member or flexible diaphragm.

20. The article of claim 18 wherein a vulcanized rubber layer and a compressible elastomeric layer are included as additional layers and the article is used as a printing blanket.

21. A composite article comprising a compressible fabric comprising a plurality of warp and fill fibers or yarns forming a facric substrate and a matrix material on one side of the fabric substrate in an amount sufficient to at least partially impregnate substantially all of the fibers, yarns and interstices of the fabric substrate, the matrix material containing a plurality of cells therein in an amount sufficient to impart increased compressibility properties to the fabric, wherein the thickness of the partially impregnated substrate is substantially the same as that of the unimpregnated substrate, and a first layer or coating which imparts a desired property to the article, said layer or coating superimposed in face relation onto said side of the fabric substrate which is impregnated with said cell-containing matrix material.

22. The article of claim 21 wherein both sides of the fabric substrate are impregnated with the matrix material and a second layer or coating which imparts a desired property to the article is superimposed in face relation onto said side of the fabric substrate which does not contain the first layer or coating.

* * * * *